US009489333B2

(12) United States Patent
Yong et al.

(10) Patent No.: US 9,489,333 B2
(45) Date of Patent: Nov. 8, 2016

(54) ADAPTIVE TERMINATION SCHEME FOR LOW POWER HIGH SPEED BUS

(71) Applicant: Intel Corporation, Santa Clara, CA (US)

(72) Inventors: Khang Choong Yong, Puchong (MY); Wil Choon Song, Bayan Lepas (MY); Howard L. Heck, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 14/499,109

(22) Filed: Sep. 27, 2014

(65) Prior Publication Data

US 2016/0092392 A1   Mar. 31, 2016

(51) Int. Cl.
*G06F 13/00* (2006.01)
*G06F 13/40* (2006.01)
*G06F 11/22* (2006.01)
*G06F 11/30* (2006.01)

(52) U.S. Cl.
CPC ......... *G06F 13/4086* (2013.01); *G06F 11/221* (2013.01); *G06F 11/3027* (2013.01)

(58) Field of Classification Search
None
See application file for complete search history.

(56) References Cited

U.S. PATENT DOCUMENTS 8,278,964 B2 * 10/2012 Ware ............... G01R 31/31707
324/500
2005/0268002 A1 * 12/2005 Gregory ............. G06F 13/4086
710/15

* cited by examiner

*Primary Examiner* — Idriss N Alrobaye
*Assistant Examiner* — Richard B Franklin
(74) *Attorney, Agent, or Firm* — Alpine Technology Law Group LLC

(57) ABSTRACT

Methods and apparatus relating to an adaptive termination scheme for a low power, high speed bus are described. In an embodiment, logic at least partially causes termination of a portion (e.g., one or more transmission lines) of an interconnect. The logic adaptively optimizes the number of lines that are to be terminated based on one or more operating conditions of the interconnect. Other embodiments are also disclosed.

19 Claims, 7 Drawing Sheets

ADAPTIVE TERMINATION SCHEME FOR LOW POWER HIGH SPEED BUS

FIELD

The present disclosure generally relates to the field of electronics. More particularly, an embodiment relates to an adaptive termination scheme for a low power, high speed bus.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Generally, single-ended point-to-point communication channels are susceptible to crosstalk noise, and crosstalk can be identified as one key limiter to enable transmission at gigahertz levels. It is common practice to use termination to improve signal integrity by suppressing the signal reflections and crosstalk noise present on such single-ended point-to-point channels. One problem with some termination approaches is that all lines are terminated on both ends of single-ended point-to-point channels. This can in turn cause: (1) power consumption increases due to resistive termination at both ends; (2) BOM (Bill of Materials) cost increases due to the required termination component(s) (e.g., number of pin(s) and/or resistor(s) are increased); and/or (3) available real-estate is reduced due to the area occupied by the additional resistor/pin footprint.

To this end, some embodiments provide an adaptive termination scheme for low power, high-speed buses. As discussed herein, the term "bus" can be interchangeably referred to as "interconnect." Moreover, the adaptive termination techniques may be used in high-speed interconnects such as single-ended, point-to-point communication link/channel(s) (e.g., operating at gigahertz transmission speeds). In one embodiment, a lower power consumption termination solution (for example, about 50 mW to 250 mW power savings for a 100-bit width bus) is provided for smaller form factor designs such as mobile computing devices (including, for example, a smartphone, tablet, UMPC (Ultra-Mobile Personal Computer), laptop computer, Ultrabook™ computing device, wearable devices (such as a smart watch and smart glasses), etc.).

In an embodiment, an interconnect is partially terminated (e.g., to take advantage of power savings provided via a tuning logic/algorithm) to adaptively optimize the number of lines that are to be terminated at least partially based on one or more operating conditions (such as the speed mode of the bus, type of load coupled to the bus, operating temperature, etc.) The tuning algorithm is integrated into logic (e.g., a transceiver) in one embodiment.

Figure 1:
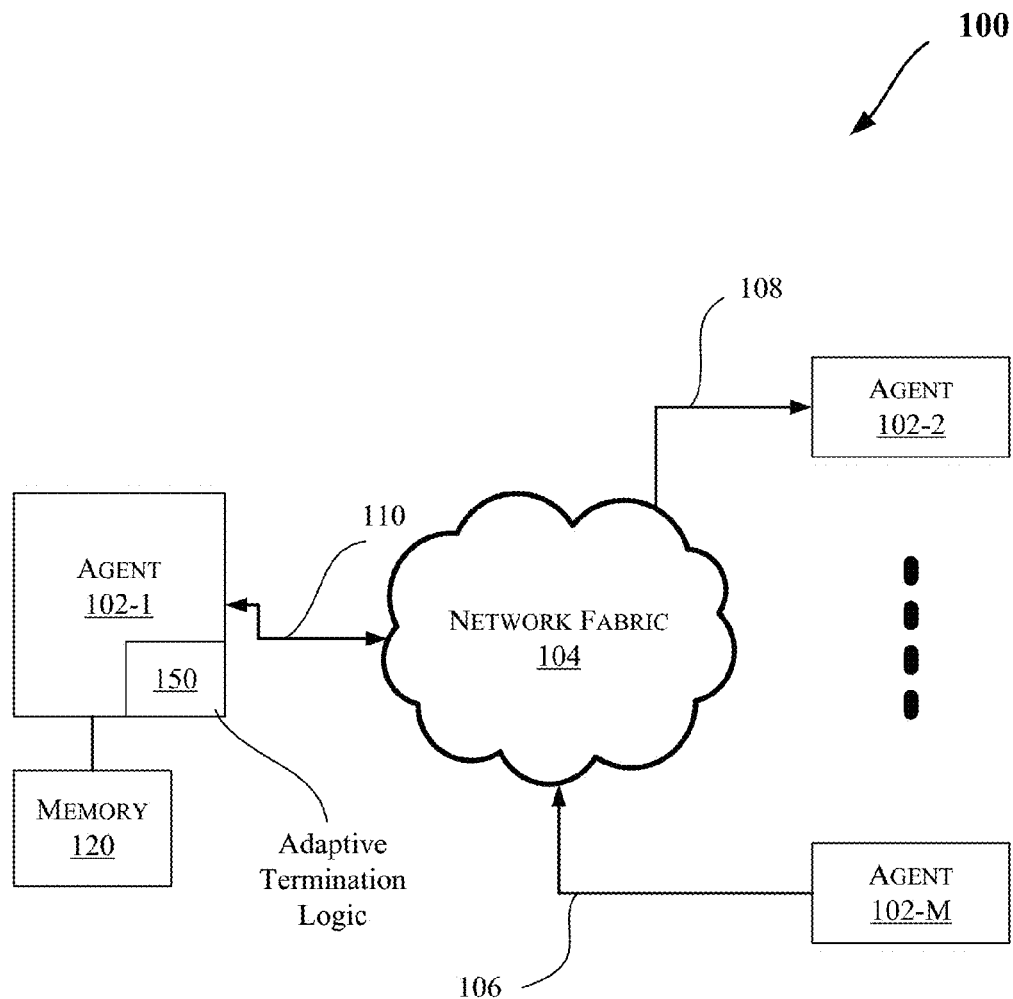
FIG. 1 illustrates a block diagram of an embodiment of a computing systems, which can be utilized to implement various embodiments discussed herein.

Moreover, the techniques discussed herein can be utilized in various computing systems (e.g., including a mobile device such as a smartphone, tablet, UMPC (Ultra-Mobile Personal Computer), laptop computer, Ultrabook™ computing device, wearable devices (such as smart watches, smart glasses), etc.), including those discussed with reference to FIGS. 1-7. More particularly, FIG. 1 illustrates a block diagram of a computing system 100, according to an embodiment. The system 100 includes one or more agents 102-1 through 102-M (collectively referred to herein as "agents 102" or more generally "agent 102"). In an embodiment, one or more of the agents 102 are components of a computing system, such as the computing systems discussed with reference to FIGS. 1-7.

As illustrated in FIG. 1, the agents 102 communicate via a network fabric 104. In one embodiment, the network fabric 104 includes a computer network that allows various agents (such as computing devices) to communicate data. In an embodiment, the network fabric 104 includes one or more interconnects (or interconnection networks) that communicate via a serial (e.g., point-to-point) link and/or a shared communication network (which is be configured as a ring in an embodiment). Each link may include one or more lanes. For example, some embodiments facilitate component debug or validation on links that allow communication with Fully Buffered Dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 100 supports a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point or shared network. Also, in some embodiments, the network fabric 104 provides communication that adheres to one or more cache coherent protocols.

Furthermore, as shown by the direction of arrows in FIG. 1, the agents 102 can transmit and/or receive data via the network fabric 104. Hence, some agents utilize a unidirectional link, while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) both transmit and receive data (e.g., via a bidirectional link 110).

Additionally, at least one of the agents 102 is a home agent and one or more of the agents 102 are requesting or caching agents. Generally, requesting/caching agents send request(s) to a home node/agent for access to a memory address with which a corresponding "home agent" is associated. Further, in an embodiment, one or more of the agents 102 (only one shown for agent 102-1) have access to a memory (which can be dedicated to the agent or shared with other agents) such as memory 120. In some embodiments, each (or at least one) of the agents 102 is coupled to the memory 120 that is either on the same die as the agent or otherwise accessible by the agent. Also, as shown in FIG. 1, agents 102 include adaptive termination logic 150 to support a low power, high speed bus, as discussed herein.

Figure 2:
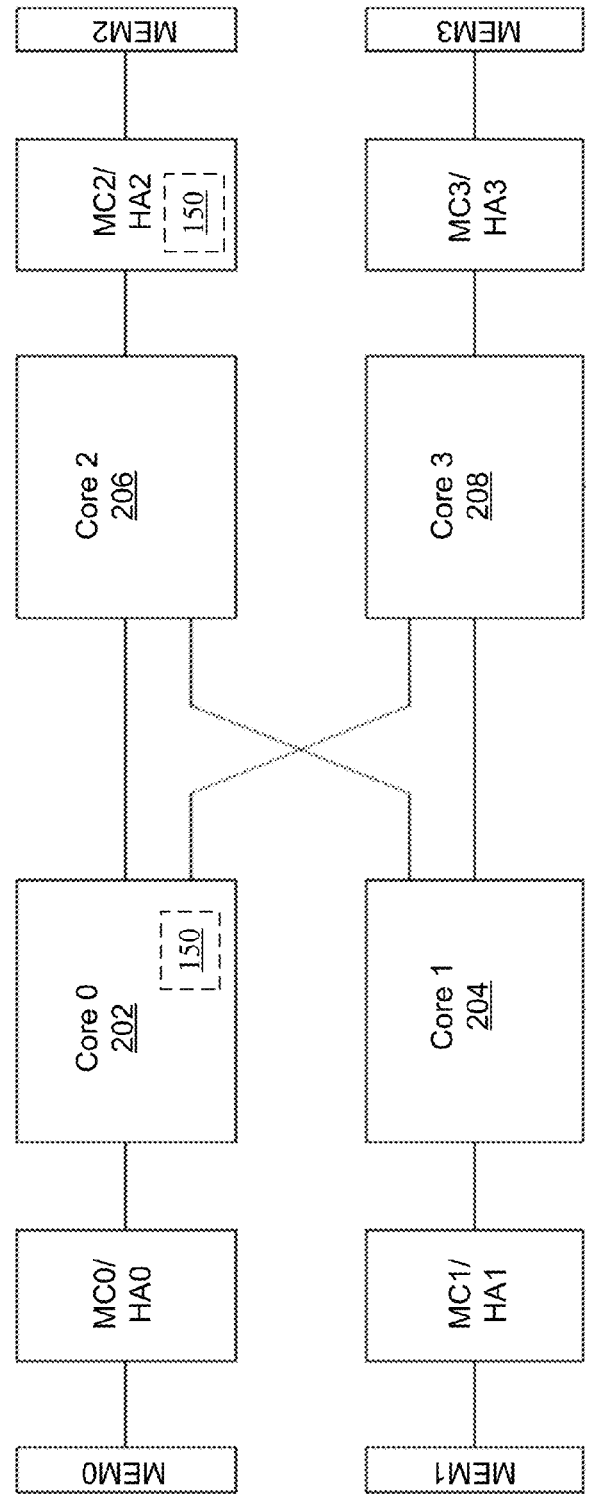
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor. Also, various agents in the system 200 can communicate via logic 150. Even though logic 150 is only shown in items 202 and MC2/HA2, logic 150 may be provided in other agents of system 200. Further, more or less logic blocks can be present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric is utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment, a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 512 of FIG. 5). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, at least one implementation (such as shown in FIG. 2) can be used for a socket glueless configuration with mirroring. For example, data assigned to a memory controller (such as MC0/HA0) is mirrored to another memory controller (such as MC3/HA3) over the PtP links.

In some embodiments, a bus is partially terminated (instead of fully terminated as in the previous solutions) to take the advantage of power saving via a tuning algorithm performed by logic 150 (e.g., which can be integrated into a transceiver in an embodiment) to adaptively optimize the number of lines to be terminated with respect to various operating conditions (such as speed mode, type of load, operating temperature, etc.).

Generally, the bandwidth of a multi-gigahertz single-ended bus is crosstalk limited. And, the near-end crosstalk received at the far-end is induced by the far-end reflected signals. Hence, the number of lines to be far-end terminated can be optimized to suppress the near-end crosstalk just enough to meet the semiconductor/silicon specification goals (e.g., in contrast to previous solutions where all lines have to be terminated, which can be considered an overdesign).

Moreover, an optimum termination scheme for the bus can be identified through simulation (for example, by sweeping through the termination scheme from worst to best scenarios until semiconductor/silicon specification goal(s) are met), or integrated as a tuning algorithm (e.g., via logic 150) into a transceiver to adaptively optimize the termination scheme for various speed mode, type of load, etc. In an embodiment, the optimum termination scheme just needs to be optimized once for every platform design (i.e., with no further optimization needed during normal boot time or operating mode). In various embodiments, the termination configuration (e.g., determined by method 300 of FIG. 3) can be determined on-the-fly (e.g., during run-time or boot time) and the termination configuration stored in memory for future access or next boot up. Alternatively, the termination configuration can be performed on-the-fly for each boot, i.e., without the need for memory to store termination configuration information. As a result, a bus with the optimum termination scheme uses less termination components when compared to the previous solutions; thus, allowing designs with lower power consumption. The amount of total power saved by some embodiments will scale with the bus size (i.e., the larger the bus size, the more power will be saved).

Figure 3:
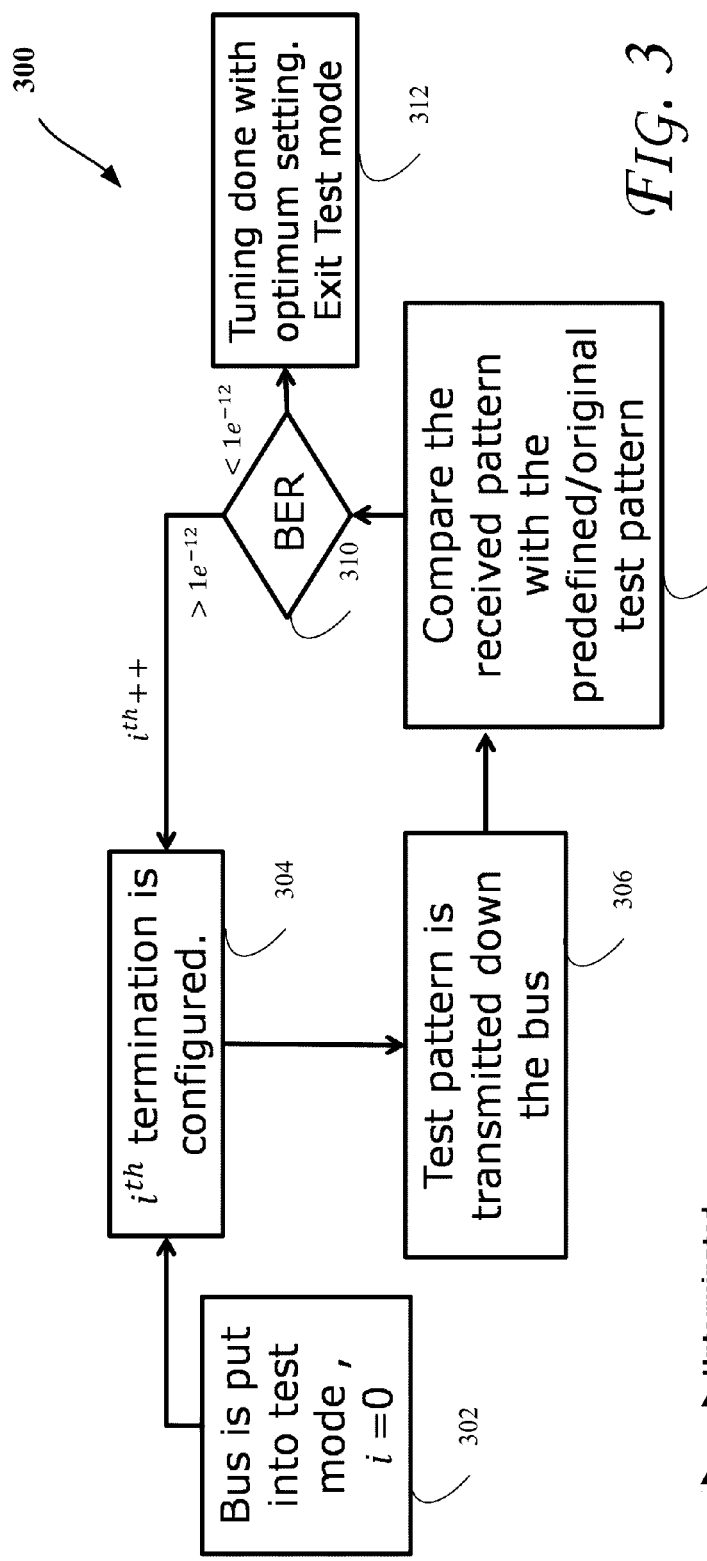
FIG. 3 illustrates a flow diagram of a method to provide an adaptive termination scheme for a low power, high speed bus, in accordance with an embodiment.
Figure 3:
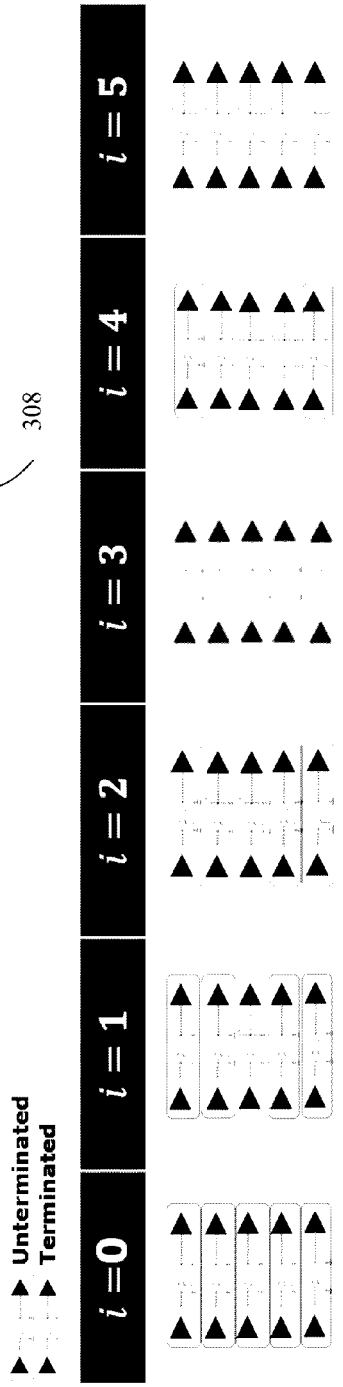

FIG. 3 illustrates a flow diagram of a method 300 to provide an adaptive termination scheme (e.g., for a low power, high speed bus), in accordance with an embodiment. In one embodiment, various components discussed with reference to FIGS. 1-2 and 4-7 can be utilized to perform one or more of the operations discussed with reference to FIG. 3. In an embodiment, method 300 is implemented in logic, such as logic 150 of FIG. 1 (which may be included in a transceiver).

Referring to FIGS. 1-3, at operation 302, a bus/interconnect is put into a test mode (e.g., starting with iteration 0). At operation 304, the $i^{th}$ termination is configured (e.g., based on initial configuration values or previous configuration of the bus/interconnect discussed herein). An operation 306 causes transmission of a test pattern down the bus/interconnect. An operation 308 compares the received pattern with a predefined/original test pattern. If the BER (Bit Error Rate) is less than (or equal to) a threshold value (e.g., $1e^{-12}$) at an operation 310, operation 312 performs tuning with the determined (optimum) settings and the test mode is exited. If the BER is larger than a threshold value (e.g., $1e^{-12}$) at an operation 310, operation 304 is repeated for the next iteration (i.e., "i" is incremented after operation 310). Moreover, the bottom portion of FIG. 3 illustrates sample termination results, e.g., based on the number of iterations performed by method 300. As can be seen, depending on the optimization/tuning scheme, the number of terminated bus/interconnect lines increases as more iterations are performed (i.e., by missing the comparison goal determined at operation 310).

Figure 4:
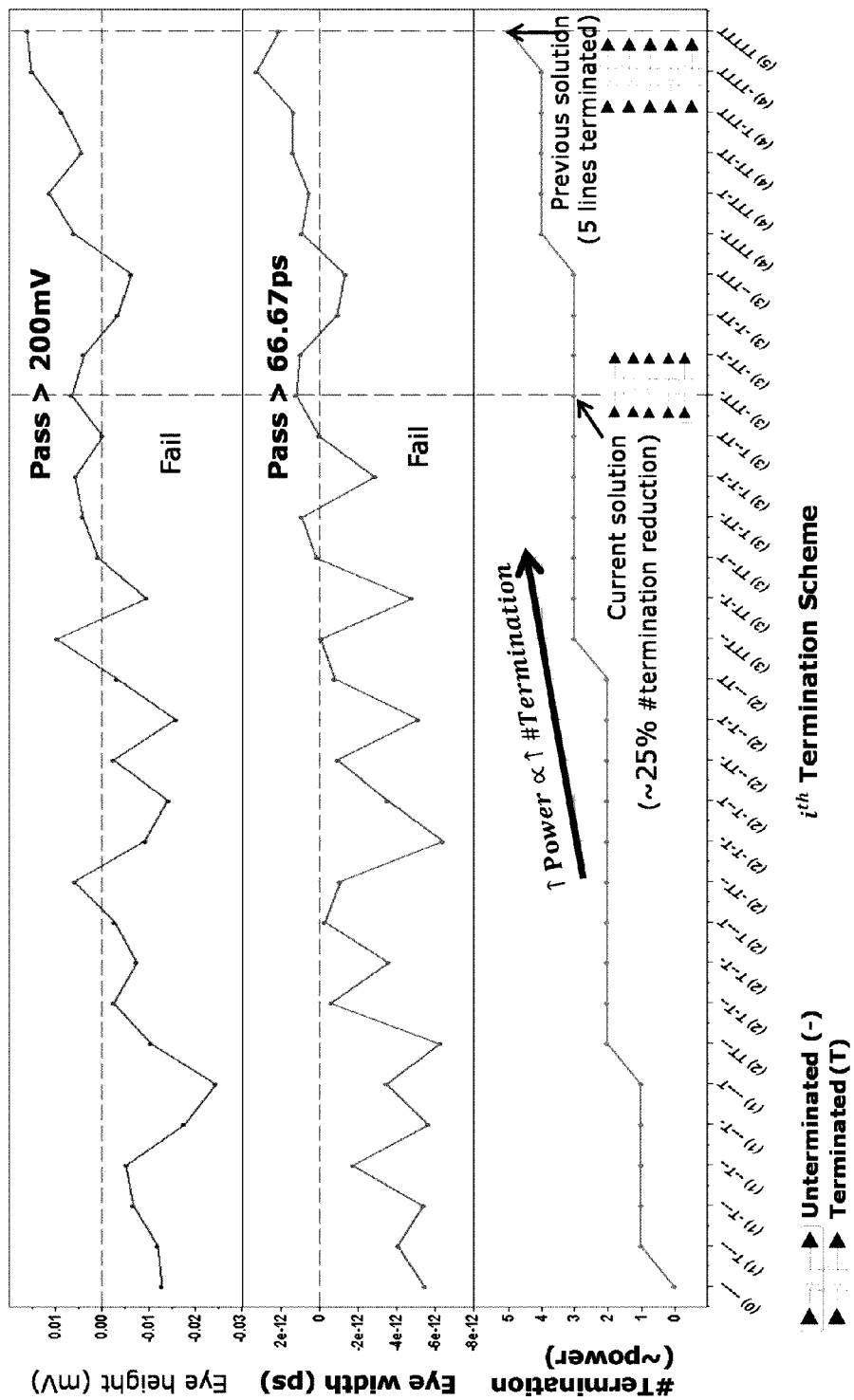
FIG. 4 illustrates graphs showing the impact and/or benefit of a termination scheme, according to some embodiments.

FIG. 4 illustrates graphs showing the impact and/or benefit of a termination scheme, according to some embodiments. To reduce training time for 64-bit or 128-bit wide buses, approach such as per-byte-optimization with artificial intelligence algorithms can be considered. For example, DDR (Double Data Rate) bus termination can be tuned per-byte-group to reduce the training time, but potentially with some accuracy trade-off (for example, power may not be truly optimized). However, this is just a one time off training per design in one embodiment.

In an embodiment, a simulation setup includes a single-ended point-to-point with five transmission lines. The test vehicle can be simulated at 5 GHz transmission rate. Assume the reference specifications of eye height greater than about 200 mV and eye width greater than about 66.67 ps, the respective line with worst case signal integrity metrics (eye width, eye height) of each termination scheme are measured, as depicted in FIG. 4.

Referring to FIG. 4, an example of 100-bit width bus, the total power saved can range from about 50 mW to about 250 mW. Assuming from the DDR example, about 2 mW to about 10 mW power is saved per pin with different schemes, On-Die-Termination (ODT) from about 60 ohm to about 120 ohm. Hence, the adaptive termination scheme is highly prospective to enable low power smaller form factor designs that potentially save about 50 mW to about 250 mW of power for a 100-bit width bus.

Figure 5:
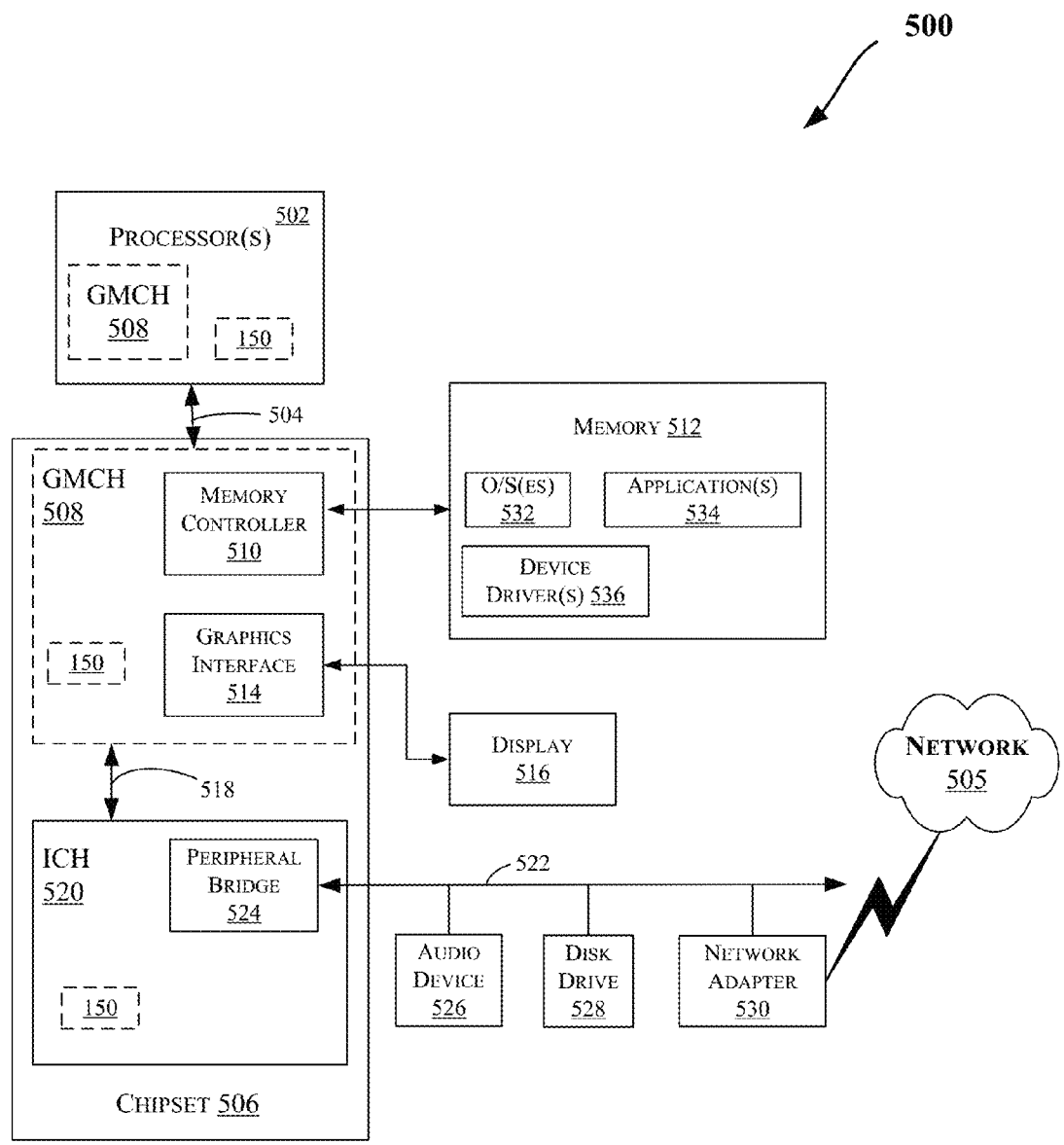
FIG. 5 illustrates a block diagram of an embodiment of a computing system, which can be utilized to implement one or more embodiments discussed herein.

FIG. 5 illustrates a block diagram of an embodiment of a computing system 500. One or more of the agents 102 of FIG. 1 may comprise one or more components of the computing system 500. Also, various components of the system 500 include logic 150 as illustrated in FIG. 5. However, logic 150 may be provided in locations throughout the system 500, including or excluding those illustrated. The computing system 500 includes one or more central processing unit(s) (CPUs) 502 (collectively referred to herein as "processors 502" or more generically "processor 502") coupled to an interconnection network (or bus) 504. The operations discussed with reference to FIGS. 1-4 can be performed by one or more components of the system 500.

The processors 502 can be any type of processor such as a general purpose processor, a network processor (which processes data communicated over a computer network 505), etc. (including a reduced instruction set computer (RISC) processor or a complex instruction set computer (CISC)). Moreover, the processors 502 has a single or multiple core design. The processors 502 with a multiple core design integrate different types of processor cores on the same integrated circuit (IC) die. Also, the processors 502 with a multiple core design can be implemented as symmetrical or asymmetrical multiprocessors.

The processor 502 include one or more caches, which are private and/or shared in various embodiments. Generally, a cache stores data corresponding to original data stored elsewhere or computed earlier. To reduce memory access latency, once data is stored in a cache, future use can be made by accessing a cached copy rather than prefetching or recomputing the original data. The cache(s) can be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) can be located in various locations (e.g., inside other components to the computing systems discussed herein, including systems of FIG. 1, 2, 5, 6, or 7).

A chipset 506 can additionally be coupled to the interconnection network 504. Further, the chipset 506 includes a graphics memory control hub (GMCH) 508. The GMCH 508 includes a memory controller 510 that is coupled to a memory 512. The memory 512 stores data, e.g., including sequences of instructions that are executed by the processor 502, or any other device in communication with components of the computing system 500. Also, in one embodiment, the memory 512 includes one or more volatile storage (or memory) devices such as random access memory (RAM), dynamic RAM (DRAM), synchronous DRAM (SDRAM), static RAM (SRAM), etc. Nonvolatile memory can also be utilized such as a hard disk. Additional devices can be coupled to the interconnection network 504, such as multiple processors and/or multiple system memories.

The GMCH 508 further includes a graphics interface 514 coupled to a display device 516 (e.g., via a graphics accelerator in an embodiment). In one embodiment, the graphics interface 514 is coupled to the display device 516 via an Accelerated Graphics Port (AGP) or Peripheral Component Interconnect (PCI) (or PCI express (PCIe) interface). In an embodiment, the display device 516 (such as a flat panel display) is coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 couples the GMCH 508 to an input/output control hub (ICH) 520. The ICH 520 provides an interface to input/output (I/O) devices coupled to the computing system 500. The ICH 520 is coupled to a bus 522 through a peripheral bridge (or controller) 524, such as a Peripheral Component Interconnect (PCI) bridge that is compliant with the PCIe specification, a Universal Serial Bus (USB) controller, I2C (Interface to Communicate), etc. The bridge 524 provides a data path between the processor 502 and peripheral devices. Other types of topologies can also be utilized. Additionally, multiple buses can be coupled to the ICH 520, e.g., through multiple bridges or controllers. Further, bus 522 can comprises other types and configurations of bus systems. Moreover, other peripherals coupled to the ICH 520 include, in various embodiments, integrated drive electronics (IDE) or small computer system interface (SCSI) hard drive(s), USB port(s), I2C device(s), a keyboard, a mouse, parallel port(s), serial port(s), floppy disk drive(s), digital output support (e.g., digital video interface (DVI)), etc.

The bus 522 is coupled to an audio device 526, one or more disk drive(s) 528, and a network adapter 530 (which is a NIC in an embodiment). In one embodiment, the network adapter 530 or other devices coupled to the bus 522 communicate with the chipset 506. Also, various components (such as the network adapter 530) are coupled to the GMCH 508 in some embodiments. In addition, the processor 502 and the GMCH 508 can be combined to form a single chip. In an embodiment, the memory controller 510 is provided in one or more of the CPUs 502. Further, in an embodiment, GMCH 508 and ICH 520 are combined into a Peripheral Control Hub (PCH).

Additionally, the computing system 500 includes volatile and/or nonvolatile memory (or storage). For example, nonvolatile memory includes one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 includes one or more of the following in an embodiment: an operating system (O/S) 532, application 534, and/or device driver 536. The memory 512 can also include regions dedicated to Memory Mapped I/O (MMIO) operations. Programs and/or data stored in the memory 512 are swapped into the disk drive 528 as part of memory management operations. The application(s) 534 execute (e.g., on the processor(s) 502) to communicate one or more packets with one or more computing devices coupled to the network 505. In an embodiment, a packet is a sequence of one or more symbols and/or values that are encoded by one or more electrical signals transmitted from at least one sender to at least on receiver (e.g., over a network such as the network 505). For example, each packet has a header that includes various information which is utilized in routing and/or processing the packet, such as a source address, a destination address, packet type, etc. Each packet has a payload that includes the raw data (or content) the packet is transferring between various computing devices over a computer network (such as the network 505).

In an embodiment, the application 534 utilizes the O/S 532 to communicate with various components of the system 500, e.g., through the device driver 536. Hence, the device driver 536 includes network adapter 530 specific commands to provide a communication interface between the O/S 532 and the network adapter 530, or other I/O devices coupled to the system 500, e.g., via the chipset 506.

In an embodiment, the O/S 532 includes a network protocol stack. A protocol stack generally refers to a set of procedures or programs that is executed to process packets sent over a network 505, where the packets conform to a specified protocol. For example, TCP/IP (Transport Control Protocol/Internet Protocol) packets are processed using a TCP/IP stack. The device driver 536 indicates the buffers in the memory 512 that are to be processed, e.g., via the protocol stack.

The network 505 can include any type of computer network. The network adapter 530 can further include a direct memory access (DMA) engine, which writes packets to buffers (e.g., stored in the memory 512) assigned to available descriptors (e.g., stored in the memory 512) to transmit and/or receive data over the network 505. Additionally, the network adapter 530 includes a network adapter controller logic (such as one or more programmable processors) to perform adapter related operations. In an embodiment, the adapter controller is a MAC (media access control) component. The network adapter 530 further includes a memory, such as any type of volatile/nonvolatile memory (e.g., including one or more cache(s) and/or other memory types discussed with reference to memory 512).

Figure 6:
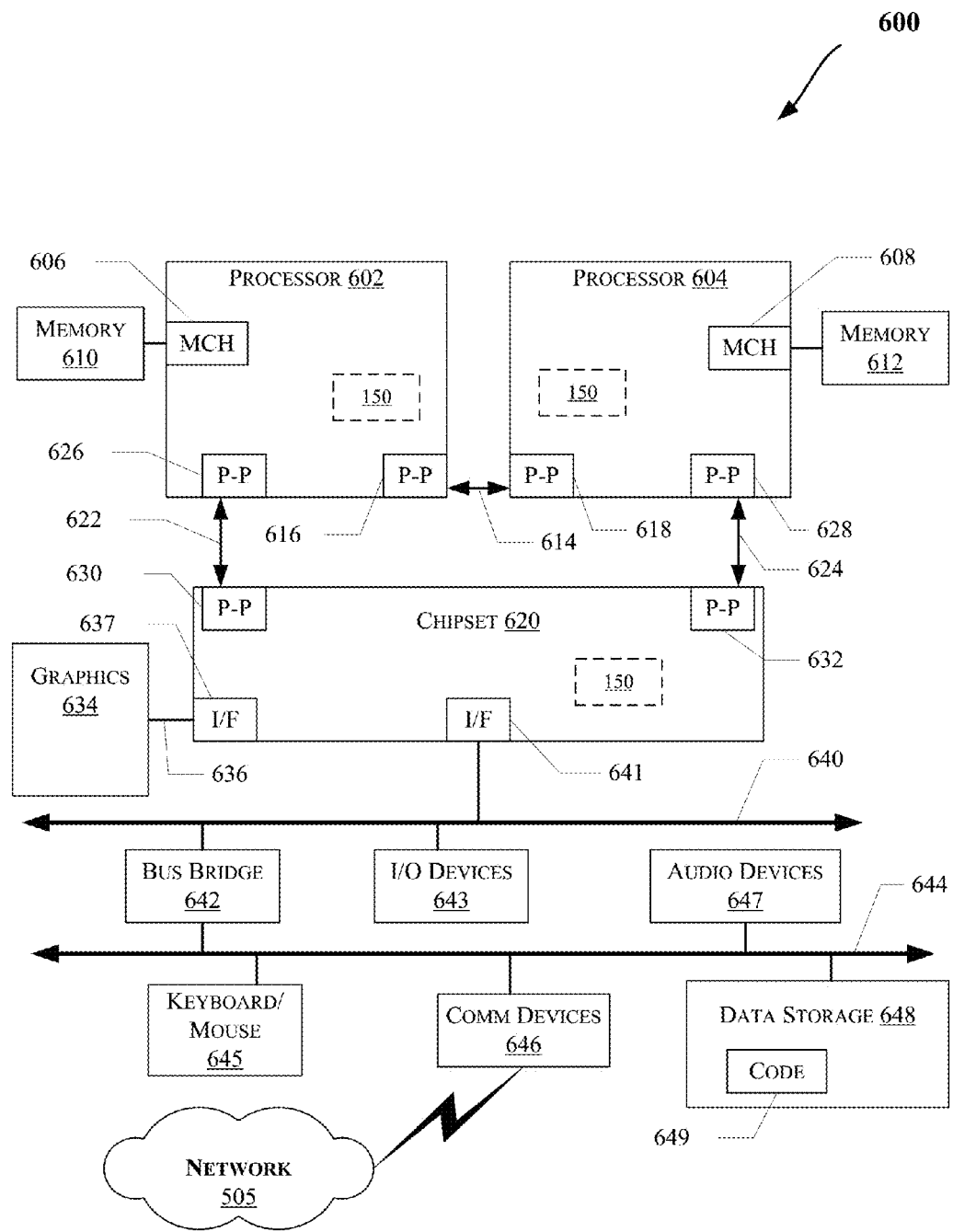
FIG. 6 illustrates a block diagram of an embodiment of a computing system, which can be utilized to implement one or more embodiments discussed herein.

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 can be performed by one or more components of the system 600.

As illustrated in FIG. 6, the system 600 includes several processors, of which only two, processors 602 and 604 are shown for clarity. The processors 602 and 604 each include a local Memory Controller Hub (MCH) 606 and 608 to enable communication with memories 610 and 612. The memories 610 and/or 612 store various data such as those discussed with reference to the memory 612 of FIG. 6. As shown in FIG. 6, the processors 602 and 604 (or other components of system 600 such as chipset 620, I/O devices 643, etc.) can also include one or more cache(s) such as those discussed with reference to FIGS. 1-5.

In an embodiment, the processors 602 and 604 are one of the processors 602 discussed with reference to FIG. 6. The processors 602 and 604 exchange data via a point-to-point (PtP) interface 614 using PtP interface circuits 616 and 618, respectively. Also, the processors 602 and 604 can each exchange data with a chipset 620 via individual PtP interfaces 622 and 624 using point-to-point interface circuits 626, 628, 630, and 632. The chipset 620 can further exchange data with a high-performance graphics circuit 634 via a high-performance graphics interface 636, e.g., using a PtP interface circuit 637.

In at least one embodiment, logic 150 is provided in one or more of the processors 602, 604 and/or chipset 620. Other embodiments, however, may exist in other circuits, logic units, or devices within the system 600 of FIG. 6. Furthermore, other embodiments may be distributed throughout several circuits, logic units, or devices illustrated in FIG. 6. For example, various components of the system 600 include the logic 150 of FIG. 1. However, logic 150 can be provided in locations throughout the system 600, including or excluding those illustrated.

The chipset 620 communicates with the bus 640 using a PtP interface circuit 641. The bus 640 has one or more devices that communicate with it, such as a bus bridge 642 and I/O devices 643. Via a bus 644, the bus bridge 642 communicates with other devices such as a keyboard/mouse 645, communication devices 646 (such as modems, network interface devices, or other communication devices that communicate with the computer network 605), audio I/O device, and/or a data storage device 648. The data storage device 648 stores code 649 that is executed by the processors 602 and/or 604.

Figure 7:
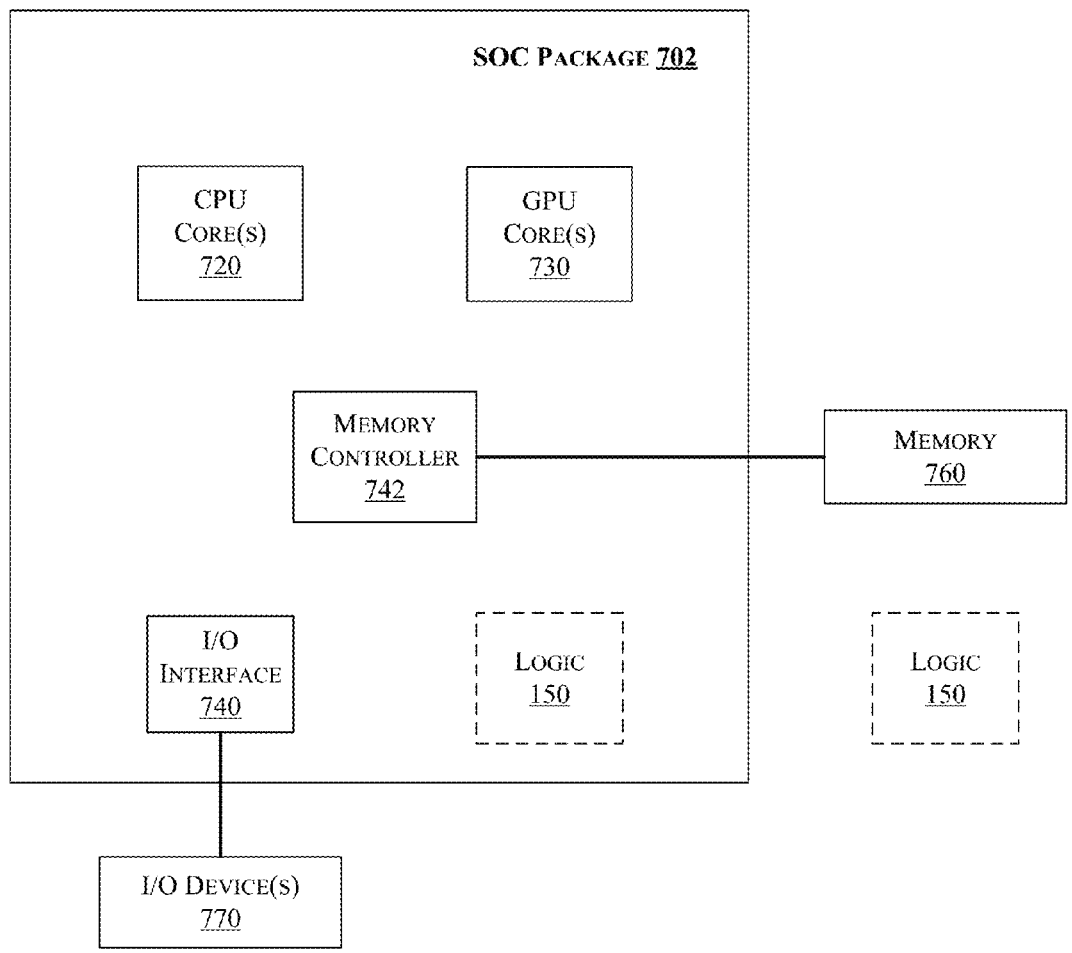
FIG. 7 illustrates a block diagram of a System On Chip (SOC) package in accordance with an embodiment.

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 are coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which can be similar to or the same as memory discussed herein with reference to the other figures) via the memory controller 742. In an embodiment, the memory 760 (or a portion of it) can be integrated on the SOC package 702.

The I/O interface 740 is coupled to one or more I/O devices 770, e.g., via an interconnect and/or bus such as discussed herein with reference to other figures. I/O device(s) 770 include one or more of a keyboard, a mouse, a touchpad, a display, an image/video capture device (such as a camera or camcorder/video recorder), a touch screen, a speaker, or the like. Furthermore, SOC package 702 includes/integrates the logic 150 in an embodiment. Alternatively, the logic 150 is provided outside of the SOC package 702 (i.e., as a discrete logic).

The following examples pertain to further embodiments. Example 1 includes an apparatus comprising: logic to at least partially cause termination of a portion of an interconnect, wherein the logic is to determine the portion of the interconnect that is to be at least partially terminated based on one or more operating conditions of the interconnect. Example 2 includes the apparatus of example 1, wherein the one or more operating conditions are to comprise at least one of a speed mode of the interconnect, an operating temperature of the interconnect, and a type of load coupled to the interconnect. Example 3 includes the apparatus of example 1, wherein the logic is to determine the portion of the interconnect that is to be at least partially terminated based on comparison of a test pattern transmitted over the interconnect with a threshold value. Example 4 includes the apparatus of example 3, wherein test pattern is to be determined at least partially based on the on one or more operating conditions of the interconnect. Example 5 includes the apparatus of example 3, wherein the comparison is to be at least partially based on a bit error rate associated with the transmitted test pattern. Example 6 includes the apparatus of example 1, wherein the portion of the interconnect is to include one or more transmission lines. Example 7 includes the apparatus of example 1, wherein a transceiver is to comprise the logic. Example 8 includes the apparatus of example 1, wherein the logic is to determine whether to at least partially cause termination of the portion of the interconnect once for every platform design. Example 9 includes the apparatus of example 1, wherein the logic, a processor having one or more processor cores, and memory are on a same integrated device. Example 10 includes the apparatus of example 1, wherein the logic is to cause storage of information associated with termination of the portion of the interconnect in memory. Example 11 includes the apparatus of example 1, wherein the interconnect is to comprise a point-to-point link. Example 12 includes the apparatus of example 1, wherein the interconnect is to comprise a single-ended point-to-point link.

Example 13 includes a method comprising: at least partially causing termination of a portion of an interconnect, wherein the portion of the interconnect that is at least partially terminated is determined based on one or more operating conditions of the interconnect. Example 14 includes the method of example 13, wherein the one or more operating conditions comprise at least one of a speed mode of the interconnect, an operating temperature of the interconnect, and a type of load coupled to the interconnect. Example 15 includes the method of example 13, further comprising determining the portion of the interconnect that is to be at least partially terminated based on comparison of a test pattern transmitted over the interconnect with a threshold value. Example 16 includes the method of example 15, further comprising determining the test pattern at least partially based on the on one or more operating conditions of the interconnect. Example 17 includes the method of example 15, further comprising performing the comparison at least partially based on a bit error rate associated with the transmitted test pattern. Example 18 includes the method of example 13, further comprising determining whether to at least partially cause termination of the portion of the interconnect once for every platform design. Example 19 includes the method of example 13, further comprising causing storage of information associated with termination of the portion of the interconnect in memory.

Example 20 includes a system comprising: a display device; a processor coupled to the display device to cause the display device to display one or more images stored in a memory; logic to at least partially cause termination of a portion of an interconnect, wherein the logic is to determine the portion of the interconnect that is to be at least partially terminated based on one or more operating conditions of the interconnect. Example 21 includes the system of example 20, wherein the one or more operating conditions are to comprise at least one of a speed mode of the interconnect, an operating temperature of the interconnect, and a type of load coupled to the interconnect. Example 22 includes the system of example 20, wherein the logic is to determine the portion of the interconnect that is to be at least partially terminated based on comparison of a test pattern transmitted over the interconnect with a threshold value. Example 23 includes the system of example 22, wherein test pattern is to be determined at least partially based on the on one or more operating conditions of the interconnect. Example 24 includes the system of example 22, wherein the comparison is to be at least partially based on a bit error rate associated with the transmitted test pattern. Example 25 includes the system of example 20, wherein the portion of the interconnect is to include one or more transmission lines. Example 26 includes the system of example 20, wherein a transceiver is to comprise the logic. Example 27 includes the system of example 20, wherein the logic is to determine whether to at least partially cause termination of the portion of the interconnect once for every platform design. Example 28 includes the system of example 20, wherein the logic, the processor having one or more processor cores, and the memory are on a same integrated device. Example 29 includes the system of example 20, wherein the logic is to cause storage of information associated with termination of the portion of the interconnect in the memory. Example 30 includes the system of example 20, wherein the interconnect is to comprise a point-to-point link. Example 31 includes the system of example 20, wherein the interconnect is to comprise a single-ended point-to-point link.

Example 32 includes an apparatus comprising means to perform a method as set forth in any preceding example. Example 33 includes machine-readable storage including machine-readable instructions, when executed, to implement a method or realize an apparatus as set forth in any preceding example.

In various embodiments, the operations discussed herein, e.g., with reference to FIGS. 1-7, are implemented as hardware (e.g., circuitry), software, firmware, microcode, or combinations thereof, which can be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media can be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    logic, at least a portion of which is in hardware, to at least partially cause termination of a portion of an interconnect, wherein the logic is to determine the portion of the interconnect that is to be at least partially terminated based on one or more operating conditions of the interconnect, wherein the logic is to determine the portion of the interconnect that is to be at least partially terminated based at least partially on comparison of a test pattern transmitted over the interconnect with a threshold value, wherein test pattern is to be determined at least partially based on the on one or more operating conditions of the interconnect.

2. The apparatus of claim 1, wherein the one or more operating conditions are to comprise at least one of a speed mode of the interconnect, an operating temperature of the interconnect, and a type of load coupled to the interconnect.

3. The apparatus of claim 1, wherein the comparison is to be at least partially based on a bit error rate associated with the transmitted test pattern.

4. The apparatus of claim 1, wherein the portion of the interconnect is to include one or more transmission lines.

5. The apparatus of claim 1, wherein a transceiver is to comprise the logic.

6. The apparatus of claim 1, wherein the logic is to determine whether to at least partially cause termination of the portion of the interconnect once for every platform design.

7. The apparatus of claim 1, wherein the logic, a processor having one or more processor cores, and memory are on a same integrated device.

8. The apparatus of claim 1, wherein the logic is to cause storage of information associated with termination of the portion of the interconnect in memory.

9. The apparatus of claim 1, wherein the interconnect is to comprise a point-to-point link.

10. The apparatus of claim 1, wherein the interconnect is to comprise a single-ended point-to-point link.

11. A method comprising:
    at least partially causing termination of a portion of an interconnect, wherein the portion of the interconnect that is at least partially terminated is determined based on one or more operating conditions of the interconnect, wherein the portion of the interconnect is to be determined based at least partially on comparison of a test pattern transmitted over the interconnect with a threshold value, wherein test pattern is determined at least partially based on the on one or more operating conditions of the interconnect.

12. The method of claim 11, wherein the one or more operating conditions comprise at least one of a speed mode of the interconnect, an operating temperature of the interconnect, and a type of load coupled to the interconnect.

13. The method of claim 11, further comprising performing the comparison at least partially based on a bit error rate associated with the transmitted test pattern.

14. The method of claim 11, further comprising determining whether to at least partially cause termination of the portion of the interconnect once for every platform design.

15. The method of claim 11, further comprising causing storage of information associated with termination of the portion of the interconnect in memory.

16. A system comprising:
   a display device;
   a processor coupled to the display device to cause the display device to display one or more images stored in a memory;
   logic to at least partially cause termination of a portion of an interconnect, wherein the logic is to determine the portion of the interconnect that is to be at least partially terminated based on one or more operating conditions of the interconnect, wherein the logic is to determine the portion of the interconnect that is to be at least partially terminated based at least partially on comparison of a test pattern transmitted over the interconnect with a threshold value, wherein test pattern is to be determined at least partially based on the on one or more operating conditions of the interconnect.

17. The system of claim 16, wherein the one or more operating conditions are to comprise at least one of a speed mode of the interconnect, an operating temperature of the interconnect, and a type of load coupled to the interconnect.

18. The system of claim 16, wherein the comparison is to be at least partially based on a bit error rate associated with the transmitted test pattern.

19. The system of claim 16, wherein the portion of the interconnect is to include one or more transmission lines.

\* \* \* \* \*